(12) United States Patent
Kawabata et al.

(10) Patent No.: US 11,154,047 B2
(45) Date of Patent: Oct. 26, 2021

(54) WRAPPING TAPE FOR REPELLING INSECTS AND LONG OBJECT USING SAME

(71) Applicant: KURARAY FASTENING CO., LTD., Osaka (JP)

(72) Inventors: Kouichi Kawabata, Osaka (JP); Satoru Ono, Fukui (JP); Takaya Hirano, Kanagawa (JP); Masahiro Sasaki, Kanagawa (JP)

(73) Assignee: KURARAY FASTENING CO., LTD., Osaka (JP)

( * ) Notice: Subject to any disclaimer, the term of this patent is extended or adjusted under 35 U.S.C. 154(b) by 0 days.

(21) Appl. No.: 16/629,088

(22) PCT Filed: Jul. 5, 2018

(86) PCT No.: PCT/JP2018/025500
§ 371 (c)(1),
(2) Date: Jan. 7, 2020

(87) PCT Pub. No.: WO2019/017210
PCT Pub. Date: Jan. 24, 2019

(65) Prior Publication Data
US 2020/0221686 A1    Jul. 16, 2020

(30) Foreign Application Priority Data

Jul. 19, 2017  (JP) .............................. JP2017-139667

(51) Int. Cl.
*A01N 25/34*    (2006.01)
*A01M 29/12*    (2011.01)
(Continued)

(52) U.S. Cl.
CPC ............. *A01M 29/12* (2013.01); *A01N 25/10* (2013.01); *A01N 25/24* (2013.01); *A01N 31/14* (2013.01);
(Continued)

(58) Field of Classification Search
CPC ........ A01M 29/12; A01N 25/34; Y10T 24/27; Y10T 24/2733; Y10T 24/2792
See application file for complete search history.

(56) References Cited

U.S. PATENT DOCUMENTS

| | | | | |
|---|---|---|---|---|
| 4,047,505 A | * | 9/1977 | McAndless | A01K 27/007 119/654 |
| 4,184,452 A | * | 1/1980 | Buzzell | A01K 27/007 119/654 |
| 4,250,838 A | * | 2/1981 | Ott | A01K 27/007 119/654 |

(Continued)

FOREIGN PATENT DOCUMENTS

| | | |
|---|---|---|
| JP | 58-224636 A | 12/1983 |
| JP | 3015230 U | 8/1995 |

(Continued)

OTHER PUBLICATIONS

International Search Report dated Oct. 9, 2018 in PCT/JP2018/025500 filed on Jul. 5, 2018 citing references AP-AR therein, 1 page.

*Primary Examiner* — Robert Sandy
*Assistant Examiner* — Michael S Lee
(74) *Attorney, Agent, or Firm* — Oblon, McClelland, Maier & Neustadt, L.L.P.

(57) ABSTRACT

An aspect of the present invention relates to a wrapping tape for repelling insects, the wrapping tape having a number of male engagement elements on a front surface of a tape, and a number of loop-shaped engagement elements on a rear surface of the tape, wherein the male engagement elements and the loop-shaped engagement elements can be engaged each other, and an insect repellent component is applied at least to the front surface of the tape and the male engagement elements.

20 Claims, 5 Drawing Sheets

(51) Int. Cl.
*A01N 25/10* (2006.01)
*A01N 25/24* (2006.01)
*A01N 31/14* (2006.01)
*A44B 18/00* (2006.01)
*B32B 3/30* (2006.01)
*B32B 5/02* (2006.01)
*B32B 7/12* (2006.01)
*B32B 27/12* (2006.01)
*B32B 27/32* (2006.01)

(52) U.S. Cl.
CPC ...... *A44B 18/0049* (2013.01); *A44B 18/0061* (2013.01); *A44B 18/0065* (2013.01); *A44B 18/0069* (2013.01); *A44B 18/0073* (2013.01); *B32B 3/30* (2013.01); *B32B 5/026* (2013.01); *B32B 7/12* (2013.01); *B32B 27/12* (2013.01); *B32B 27/32* (2013.01); *A44D 2205/00* (2013.01); *B32B 2410/00* (2013.01); *B32B 2433/00* (2013.01); *Y10T 24/2792* (2015.01)

(56) References Cited

U.S. PATENT DOCUMENTS

| | | | | |
|---|---|---|---|---|
| 4,933,187 A | * | 6/1990 | Schneider | A01N 25/26 424/462 |
| 6,108,968 A | * | 8/2000 | Peng | A01G 13/105 119/860 |
| 6,244,518 B1 | * | 6/2001 | Pogue | A01M 29/12 215/204 |
| 2002/0139061 A1 | | 10/2002 | Roberts | |
| 2003/0150467 A1 | * | 8/2003 | Robinson | A42C 5/02 132/212 |
| 2004/0247635 A1 | | 12/2004 | Igarashi et al. | |
| 2005/0081345 A1 | * | 4/2005 | Tolan | A44B 18/0003 24/452 |
| 2005/0186238 A1 | | 8/2005 | Ozawa et al. | |
| 2006/0201054 A1 | * | 9/2006 | Katsuura | A01M 1/20 43/129 |
| 2010/0272767 A1 | * | 10/2010 | Koele | A01M 1/2061 424/403 |
| 2012/0315317 A1 | * | 12/2012 | O'Hara | A01N 25/08 424/414 |
| 2017/0013824 A1 | * | 1/2017 | Jackson | A01N 25/04 |
| 2017/0035047 A1 | * | 2/2017 | Jurecka | A01N 25/34 |
| 2020/0077635 A1 | * | 3/2020 | Koehler | A01M 1/04 |

FOREIGN PATENT DOCUMENTS

| | | |
|---|---|---|
| JP | 3119905 U | 3/2006 |
| JP | 4347611 B2 | 10/2009 |

* cited by examiner

WRAPPING TAPE FOR REPELLING INSECTS AND LONG OBJECT USING SAME

TECHNICAL FIELD

The present invention relates to a wrapping tape for repelling insects and a long object including the same.

BACKGROUND ART

So far, resin products in the form of flare skirts containing, for example, arthropod repellents have been reported as insect repellent resin products (Patent Literature 1). This product contains ingredients that are repellent to insects. When this product is attached to the trunk of a plant that bears fruits, nuts, etc., pests that crawl up from the ground through the trunk, especially red imported fire ants (*Solenopsis invicta*) (red ants that inhabit the United States, etc.; recently, there are concerns about landing of such ants in Japan) are said to be able to prevent damage to crops by preventing them from going beyond their products to the berries of the trunk, due to the additive effect of the shape of the skirt and the repellent.

However, the damage caused by insects extends not only to crops but also to equipment and houses that require airtightness. For example, it has been reported at home and abroad that insects such as ants invade equipment that needs to be installed outdoors (such as vending machines) such as traffic light controllers, or equipment that is used outdoors such as automobiles, motorcycles, and tractors, thereby making a nest in such an equipment.

Furthermore, the above-mentioned fire ants are known to cause damage not only to crops and equipment but also to humans. When human are bitten by fire ants, the bitten parts bulge as if burned, causing severe pain and itching. There are many other insects that are toxic. Arthropods such as spiders and centipedes and small animals (mosquitoes, flies, cockroaches, termites, ticks, fleas, nematodes) collectively called so-called pests are also toxic. Therefore, some measures are required to prevent insects from entering buildings such as houses, apartments, condominiums, buildings, and hotels, in addition to equipment that is often operated by humans and parked outdoors, such as automobiles, motorcycles, and tractors.

In response to such a problem, an insect repellent resin product that can be wrapped around a long body connected to the inside of an object to be protected from insects has been reported (Patent Literature 2). It is said that this insect repellent resin product can prevent insects from entering the inside of an object to be protected from insects. In particular, electric devices such as traffic lights have a complicated shape compared to tree trunks, etc., but it is possible to provide a resin product that can protect a protected object having such a complicated shape from insect damage by a simple operation.

The insect repellent resin product is a resin molded product having a special shape for fitting to an object having a specific shape or is used as a spiral tape in which a resin on a flat plate with a certain degree of hardness is spiral. However, the former can be installed only on an object having a specific shape, and the latter also has a problem that it is difficult to attach/detach, in addition to a limited bundled diameter.

The present invention has been made in view of the above circumstances, and an object thereof is to provide an insect repellent tape that can be easily attached without being limited by the size and shape of an object to be installed. And the present inventors have found that the above problem can be solved with a wrapping tape for repelling insects, which has the following structure.

CITATION LIST

Patent Literature

Patent Literature 1: US 2002/0139061
Patent Literature 2: JP 4347611

SUMMARY OF INVENTION

Problems to be Solved by the Invention

That is, the wrapping tape for repelling insects according to one aspect of the present invention is a wrapping tape having a number of male engagement elements on a front surface of the tape, and a number of loop-shaped engagement elements on a rear surface of the tape, wherein the male engagement elements and the loop-shaped engagement elements can be engaged each other, and an insect repellent component is applied at least to the front surface of the tape and the male engagement elements.

DESCRIPTION OF EMBODIMENTS

Figure 1:
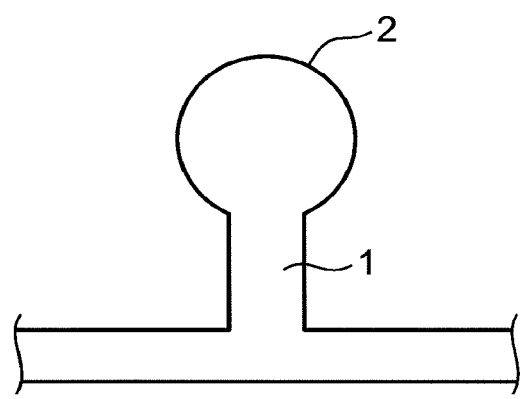
FIG. 1 is a perspective view showing an example of the shape of a male engagement element constituting a wrapping tape for repelling insects according to the present embodiment.

Hereinafter, preferred embodiments of the present invention will be specifically described with reference to the drawings.

The wrapping tape for repelling insects according to the present embodiment is characterized by having a number of male engagement elements on the front surface of the tape, and a number of loop-shaped engagement elements on the rear surface of the tape, wherein the male engagement elements and the loop-shaped engagement elements can be engaged each other, and an insect repellent component is applied at least to the front surface of the tape and the male engagement elements.

Note that the tape of the present embodiment preferably including male engagement elements on the front surface of the tape, loop-shaped engagement elements on the rear surface of the tape, and a layer existing between the male engagement elements and the loop-shaped engagement elements. Further, this layer is preferably composed of a substrate made of a thermoplastic resin and a fabric adhered to the rear surface of the substrate via an adhesive layer. Of course, the substrate and the fabric may be directly integrated without an adhesive layer. Further, when the substrate is a woven fabric, the layer existing between the male engagement elements and the loop-shaped engagement elements may be composed of the woven fabric, the adhesive layer and the rear fabric, or may be composed of the woven fabric and the rear fabric which are integrated without the adhesive. Furthermore, when the male engagement elements protrude from the front surface of the woven fabric and the loop-shaped engagement elements protrude from the rear surface, the layer existing between such engagement elements may be composed of only the woven fabric.

In a preferred embodiment, the tape has a male engagement element present on the front surface, a loop-shaped engagement element present on the rear surface, a substrate made of a thermoplastic resin existing between the male engagement element and the loop-shaped engagement element, and a fabric adhered to the rear surface of the substrate via an adhesive layer. Further, the male engagement element existing on the front surface is made of the same thermoplastic resin as the resin constituting the substrate. In addition, it is preferable that the male engagement element has a stem rising from the substrate, and the tip of the stem has an expanded head portion or a protruding portion that projects laterally, or the tip of the stem is parallel to the substrate or bent in a direction approaching the substrate. Furthermore, it is preferable that the loop-shaped engagement element is present on the rear surface of the fabric and an insect repellent component is added to the thermoplastic resin.

According to such a configuration, since the loop-shaped engagement element exists on the rear surface side, the outer male engagement element is engaged with the loop-shaped engagement element, so that it is possible to easily wrap the insect repellent tape without limitation of the size and shape of the target object to be installed. In addition, it is easy to adjust the wrapping condition so that there is no gap, and the presence of the loop-shaped engagement element on the rear surface side also has an effect of closing the gap and can further increase the insect repellent effect.

In particular, it is preferable that the male engagement elements whose stem ends are bent in an inverted J shape in the tape length direction are arranged in a row in the tape length direction and the direction of bending in a single row unit or multiple row units is the opposite direction. In that case, the male engagement element is less likely to tear from the substrate or the tip portion of the stem is broken even after repeated engagement and peeling off and can be used repeatedly for a long period of time. Furthermore, since a wide tape can be manufactured easily, such a tape can respond to various attachment objects.

Furthermore, since there are loop-shaped engagement elements on the rear surface side in contact with the object, it is less likely to slip between the long object and the tape, and there is also an advantage that can prevent the tape from sliding down from the surface of the object (particularly the long object).

As a substrate with a number of male engagement elements rising from the surface, which constitutes the front surface side of the wrapping tape for repelling insects according to the present embodiments, the following is a typical example.

First, there is a case where a number of male engagement elements made of monofilaments raised from the surface of a substrate made of a woven fabric (substrate example 1). In this substrate example 1, such a substrate can be obtained as follows: monofilaments to be male engagement elements are woven into a base fabric; the monofilaments are raised from the fabric surface in a loop shape in some places; the raised loop monofilaments are heated to fix into a loop shape; and then one leg of this loop is cut. In this case, a woven fabric substrate having a number of stems on the surface and bent in a direction parallel to or approaching the substrate is formed. Alternatively, the tip of the loop can be melted to form two stems having an expanded head portion at the tip.

In addition, as a next substrate example, there is a case where a number of stems rise in a row from a substrate made of a thermoplastic resin; the tips of the stems are inverted J-shaped and bent in the tape length direction; and the bending direction is the reverse direction in units of one row or in units of a plurality of rows (substrate example 2).

In order to obtain a substrate (substrate example 2) having such a male engagement element, first, a ring-shaped mold piece (1) in which the spaces for a number of engagement elements are carved on the outer circumference at equal intervals, a metal ring (2) where no such space is dug on the outer circumference, and the same ring-shaped mold piece (3) except that the inverted J-shaped engagement element directions are reversed, are used in a regularly superposed manner so as to be repeated in the order of (1)-(2)-(3)-(2). A die roller having a cavity for forming an inverted J-shaped engagement element is prepared on the outer circumference, and then a molten resin adjusted to a desired thickness, width, and melting temperature is extruded into a tape shape. The extruded product is passed through a gap with another drum roller existing at a position opposite to the above-described mold roller, and is stretched by pressure, thereby filling the cavity with the molten resin. Next, the resin tape is cooled and solidified by heat exchange between the refrigerant constantly circulated in the roller while the mold roller rotates and the molten resin in the cavity. At the same time, the thickness of the tape obtained is adjusted by a gap-adjusted nip roller, cooled, and then the substrate example 2 is manufactured by peeling the resin tape having the inverted J-shaped male engagement element from the roller.

Further, as a next substrate example, there is a case (substrate example 3) where stems are arranged in a row on the substrate so as to rise substantially perpendicularly from the substrate, and protrusions for engagement project from the tip portion of the stems in a direction crossing the stem row direction. Since the details of the substrate in this case will be described later, a brief description will be given here. First, a substrate and a tape on which a number of rows of male engagement elements are raised from the substrate are extruded from the nozzle. Next, a number of cuts extending from the tip to the root are formed at equal intervals in the direction across the row of male engagement elements existing on the substrate surface of the obtained tape. The substrate example 3 is produced by extending the tape in the length direction to widen the interval between the cuts and changing the row into a row of a number of independent male engagement elements.

Of these substrate examples 1 to 3, substrate examples 2 and 3 are preferable in terms of sustainability of the insect repellent component, and further, substrate example 2 is particularly preferable because it is possible to easily manufacture a tape which is wide and in which the male engagement element on the surface is difficult to tear, and which is excellent in feeling.

The following two examples can be given as representative examples of a method for imparting an insect repellent component to a substrate and a male engagement element.

First, there is mentioned a method where the insect repellent component is added to the thermoplastic resin forming the substrate and the male engagement element, and the substrate and the male engagement element are molded using the insect repellent component-containing thermoplastic resin (application method A). When this application method A is used, a tape excellent in long-lasting action and sustained release of the insect repellent component can be obtained. This method is particularly suitable for the above-mentioned substrate examples 2 and 3. Moreover, in the case of the substrate example 1, a fiber-forming resin to which an insect repellent component is added can be used as a fabric constituting fiber or a monofilament for a male engagement element.

As the next application method, there is a method in which an insect repellent component is applied to the surface of a substrate or a male engagement element after formation of the substrate and the male engagement element (application method B). When this method is used, there are advantages such that an insect repellent component can be easily applied; a high concentration of the repellent component can be applied to the tape surface; and further, the molding conditions of the tape are not limited. On the other hand, the application method B has a disadvantage such that the insect repellent component is diffused in a relatively short period of time, and the insect repellent effect disappears. However, this method can also be used when the tape is used under environmental conditions that are not exposed to wind and rain. This application method B is suitable for the substrate example 1 described above. That is, it is possible to prevent the insect repellent effect from rapidly disappearing when the insect repellent component penetrates into the woven tissue of the woven fabric serving as the substrate. In addition, when applying an insect repellent component, the insect repellent component can be delayed from disappearing rapidly by mixing and applying the insect repellent component to a resin liquid or resin emulsion.

Hereinafter, description will be given with reference to the drawings. Each reference numeral in the drawings indicates 1: a male engagement element (stem); 2: an expanded head portion of stem; 3: a protruding portion that projects to the side of the stem; 4: a shape that protrudes in the direction parallel to or approaching the substrate of the stem; 10: an extrusion nozzle; 11: a linear slit for substrate; and 12: a slit for stem.

Figure 2:
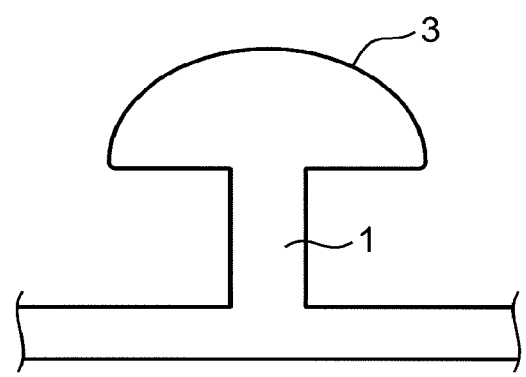
FIG. 2 is a perspective view showing another example of the shape of a male engagement element constituting a wrapping tape for repelling insects according to the present embodiment.
Figure 3A:
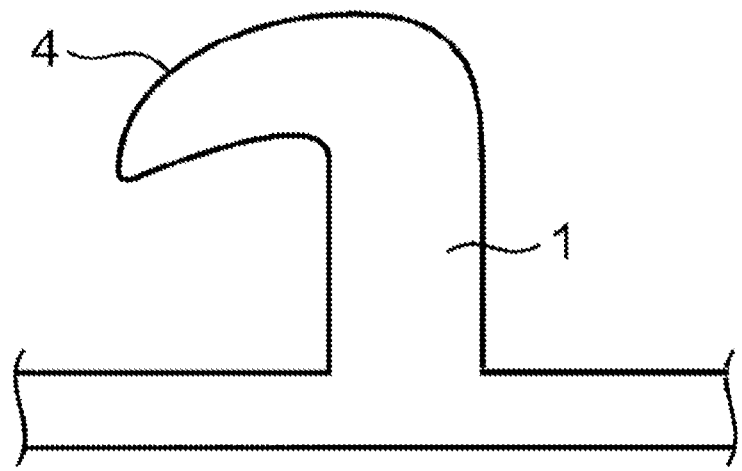
FIG. 3A is a perspective view showing still another example of the shape of a male engagement element constituting a wrapping tape for repelling insects according to the present embodiment.
Figure 3B:
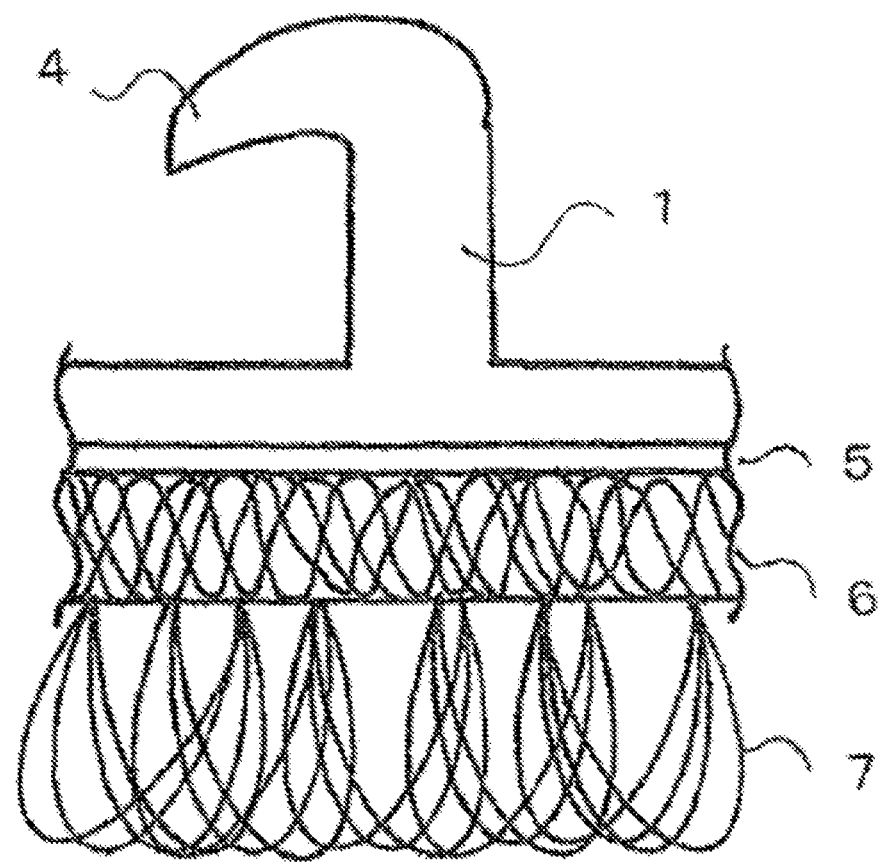
FIG. 3B is a perspective view showing still another example of the shape of a male engagement element constituting a wrapping tape for repelling insects according to the present embodiment.

A substrate on which a number of male engagement elements rise from the surface is manufactured by various methods. These male engagement elements 1 have, for example, an expanded head portion 2 as shown in FIG. 1, a protruding portion 3 that projects laterally as shown in FIG. 2, or a shape protruding in a direction parallel to or approaching the substrate from the stem as shown in FIG. 3A and 3B (FIG. 3A and 3B illustrate the shape in the direction approaching the substrate; FIG. 3B further shows an adhesive layer 5, a fabric layer 6, and loop-shaped engagement elements 7). Although the shapes of these stems 1 may be mixed, it is preferable that all the stems have the same shape for manufacturing reasons.

The stein having an expanded head portion as shown in FIG. 1 can be obtained according to the above substrate example 1, the stem having a protruding portion that projects laterally as shown in FIG. 2 can be obtained according to the above substrate example 3; and further a stem having a protruding portion that projects in a direction parallel to or approaching the substrate from the stem as shown in FIG. 3A and 3B can be obtained by any of the above substrate examples 1 to 3.

As described above, the presence of a number of stems on the surface made of a thermoplastic resin to which an insect repellent component has been added (the male engagement element may be referred to as a stem) increases the specific surface area, and it is considered that the insect repellent effect by the insect repellent is further improved.

In the present embodiment, the total surface area of the stem and the substrate is preferably 1.5 to 4.0 times the surface area of the substrate. With such a specific surface area, the insect repellent effect can be obtained more reliably. Further, the total surface area of the stem and the substrate is more preferably 2.0 to 3.0 times the surface area of the substrate. Here, the surface area of the substrate is an area in the absence of the stem, and the total surface area of the stems and the substrate can be measured by calculating the area of the front, back, side, and top of the stem that can be confirmed by magnifying and taking a photograph, with use of an image processing software, and adding each area to the area of the substrate.

In the present embodiment, the density of the stem on the substrate is not particularly limited but is preferably about 80 to 120 stems/$cm_2$ from the viewpoint of obtaining the specific surface area in the above range, and more preferably about 90 to 110 stems/$cm^2$.

In the case of the substrate example 2 and the substrate example 3 described above, the substrate and the stem are made of the same thermoplastic resin. Examples of the thermoplastic resin include a polyolefin resin, a polyurethane resin, a styrene resin, a polyamide resin, and a soft vinyl chloride resin. Among these, it is thought that by using a polyolefin resin, the protruding portion and the expanded head portion are prevented from being torn from the stem even after repeated engagement and peeling, improve the life as a wrapping tape, and further improve the adhesiveness to an object. In the case of the application method A, in order to prevent the insect repellent component from vaporization and transpiration during molding and to prevent the surface of the molded product from becoming uneven due to vaporization and transpiration of the insect repellent component, it is preferred that the melting point of the thermoplastic resin is 200° C. or less, particularly 180° C. or less.

In particular, the polyolefin resin is preferably polypropylene containing 5 to 40 weight % of a polyolefin elastomer. Thereby, even when an object to be wrapped is thin or square, the object can be adhered to the surface of the wrapping tape without gaps, so that it is considered that the above-described effects can be obtained more reliably, and such a content of the polyolefin elastomer is preferable from the viewpoint of setting the molding temperature to 200° C. or less.

In the wrapping tape for repelling insects of the present embodiment, an insect repellent component is imparted to a thermoplastic resin constituting the substrate and the stem.

Examples of the insect repellent component that can be used in the present embodiment include a compound having an insect removal activity, a compound having an insect repellent activity, a compound having an insect killing activity, and a compound having an insect antifeeding activity and an insect growth control activity. In the present specification, "insect" refers to an arthropod such as an ant, a spider, and a centipede, and a pest similar to these, which may cause harm to electrical devices, humans, and the like.

Specific insect repellent components include, for example, pyrethroid compounds, carbamate compounds, organophosphorus compounds, and isomers, derivatives, analogs thereof, and other compounds having an activity of controlling insect growth. Thereby, in particular, it is possible to more reliably prevent a hated insect such as a cockroach from entering the inside of an object.

Among them, it is preferable to include etofenprox, which is a synthetic pyrethroid compound. Thereby, an excellent repellent effect on insects can be acquired while suppressing the bad influence to a human body.

The insect repellent component is preferably added in an amount of 1 to 20 weight % based on the amount of a resin constituting the substrate and stem. If the insect repellent component is less than 1 weight %, a sufficient repellent effect may not be obtained. On the other hand, if the amount of such a repellent component exceeds 20 weight % based on the resin, the effect becomes saturated and the wrapping tape becomes expensive due to the expensive repellent. More preferably, the amount of the repellent component is 3 to 10 weight % based on the resin.

Furthermore, when using the application method A, it is more preferable that the thermoplastic resin includes a compound for dissolving and holding the insect repellent component and imparting sustained release properties. Examples of the compound having sustained release include at least one compound selected from a sulfonamide derivative, a sulfonic acid ester derivative, a carboxylic acid amide derivative, and a carboxylic acid ester derivative.

Thus, by incorporating a compound having sustained release properties into the resin, the repellent can be released from the resin over a long period of time. For example, the insect repellent effect of the insect repellent resin product according to the present invention can be maintained for about 5 years.

The substrate and stem of the present embodiment may be formed of a resin composition containing the polyolefin resin and the insect repellent component (and the sustained-release compound as necessary) as described above. Further, other resins such as polyester resins, polyamide resins, vinyl chloride resins, ethylene-vinyl alcohol copolymers, and elastomer resins such as polyolefin elastomers, styrene elastomers, polyamide elastomers, polyurethane elastomers, etc. may be blended. In addition, besides these, plasticizers, various stabilizers, weathering agents, crosslinking agents, antibacterial agents, fillers, flameproofing agents, colorants, antistatic agents, reinforcing materials, conductive agents and the like may be added. As described above, a resin having a molding temperature of 200° C. or less is similarly preferable.

The substrate and stem of the present embodiment can be manufactured as follows, taking the case as an example where the substrate example 3 is manufactured by using the application method A.

Figure 4:
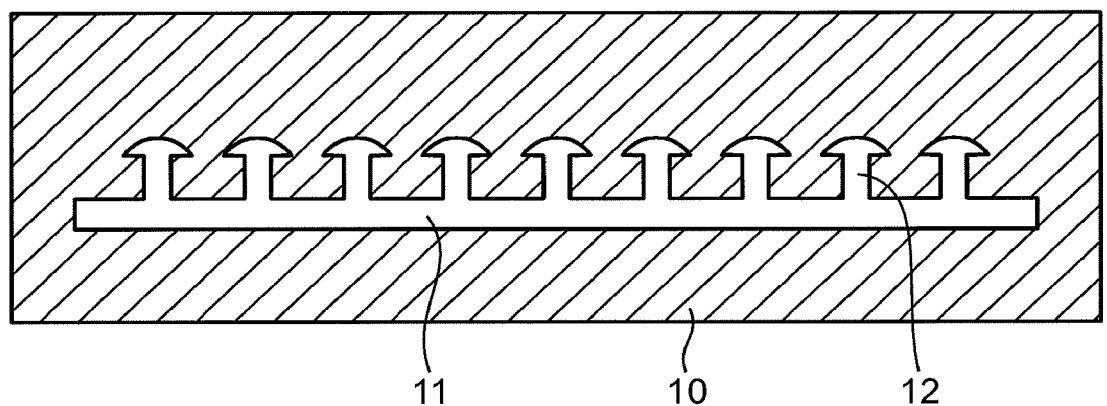
FIG. 4 is a front view of an example of an extrusion nozzle used for manufacturing a substrate and a male engagement element according to the present embodiment.

For example, in the case of a stem having a protrusion portion as shown in FIG. 2, a resin composition containing the thermoplastic resin and the insect repellent component as described above is melt-extruded from a nozzle 10 having a slit as shown in FIG. 4 and cooled to form a tape-like material having a plurality of rows with stems that are upright with respect to the substrate and continuous in the longitudinal direction on the surface of the substrate. In FIG. 4, 11 is a linear slit that will foam a substrate, and 12 is a slit that will form a stem. When the slit of FIG. 4 is used, a tape-like material is obtained in which 9 stems standing upright in a row are present at equal intervals on the substrate surface. As described above, the number of stems is preferably such that the specific surface area of the stem and the substrate can be adjusted to an appropriate range. Specifically, for example, 5 to 15 stems/1 $cm^2$ of the tape width after stretching are appropriate, and preferably 6 to 10 stems/1 $cm^2$ of the tape width.

Thereafter, cuts from the tip to around the root at small intervals are made in the stem rows present on the surface of the obtained tape-like material in a direction transverse to the row length direction, preferably in a direction perpendicular to the row length direction, or in a direction within ±30 degrees directly from the direction perpendicular to the row length direction.

The appropriate interval between the cuts is 0.2 to 0.5 mm, particularly 0.3 to 0.4 mm. Next, the tape-like material is stretched in the length direction. The draw ratio used is such that the length of the tape-like material after drawing is about 1.7 to 2.3 times the length of the original tape-like material. By performing the drawing at a low draw ratio, the wrapping tape can be prevented from tearing in the tape length direction. By this drawing, the cuts made in the rows are expanded, and such rows become rows of a number of independent stems.

The height of the stem in the present embodiment is not particularly limited, but is preferably about 0.5 to 1.1 mm, and more preferably 0.7 to 0.9 mm.

Further, the thickness of the substrate is preferably in the range of 0.1 to 1.0 mm, particularly 0.1 to 0.3 mm. Moreover, the width of the substrate can be suitably adjusted according to the width of a desired wrapping tape.

In the present embodiment, the width of the protruding portion (or expanded head portion) of the stem is preferably in the range of 0.4 to 0.9 mm, particularly 0.5 to 0.7 mm from the viewpoint of engagement force and touch feeling. Further, the width in the longitudinal direction of the stem is preferably in the range of 0.25 to 0.45 mm, particularly 0.28 to 0.40 mm. When the stem and the substrate satisfy the above range, this is preferable in view of achieving good engagement force, ease of engagement, and good touch feeling, and further obtaining difficulty in tearing the substrate.

Next, the loop fabric integrated on the rear side will be described.

In the present embodiment, the fabric integrated on the rear side of the substrate has a number of loops made of fibers that can be engaged with the stem on the surface. Such a fabric may be a female fabric surface fastener having loop-like engagement elements on the surface of the base fabric but is preferably a tricot knitted fabric. Examples of the tricot knitted fabric include a tricot fabric in which a loop pile layer composed of multifilaments is formed on one side, and the multifilaments constituting the loop pile layer are processed by raising the loop pile layer with a card clothing or the like, so that it is possible to increase the engagement force by breaking the distance of the multifilaments.

When using a tricot knitted fabric, the fibers constituting the fabric are not frayed from the end or cut portion. Further, the tricot knitted fabric is thin, and compared to a loop made of a woven fabric, the tricot knitted fabric is less likely to hinder the flexibility of the resin substrate and has excellent adhesiveness to a thin long object. Furthermore, even if the tricot knitted fabric has a low basis weight, the tricot knitted fabric can be sufficiently caught by the stem and can maintain the wrapped state for a long period of time. Furthermore, since the engagement force of the tricot knitted fabric is high and the thickness is small, the diameter is reduced when the product is wrapped in a roll shape, which is advantageous at the time of shipment, and is preferable in terms of low cost. The tricot knitted fabric also has excellent laminating power. In addition, the above-mentioned insect repellent component may be impregnated or applied to the fabric and the loop fiber integrated on the rear side of the substrate.

In the present embodiment, as a method for integrating the fabric on the rear side of the substrate, any of an adhesive, a pressure-sensitive adhesive, fusion, and sewing may be used, but a method of attaching with an adhesive is particularly preferable. There are many adhesives including urethane adhesives, acrylic adhesives, olefin adhesives, natural rubber adhesives, epoxy adhesives, etc., and urethane adhesives and/or acrylic adhesives is preferably used.

Furthermore, it is preferable that the fabric is integrated using the adhesive via a resin layer on the rear side of the substrate. It is considered that the adhesive property between the substrate and the fabric is greatly improved by using such a resin layer. This is because the adhesive property between the substrate and the fabric is greatly reduced by blending the insect repellent component into the thermoplastic resin, and the adhesive strength may be insufficient only with a polyurethane adhesive or an acrylic adhesive. If the adhering strength is insufficient, the fabric may be detached from the substrate due to repeated engagement (hitching) and peeling.

Also, by providing a resin layer on the rear surface of a substrate, it is possible to prevent a repellent component from being released slowly from the rear surface of the substrate, and there is an advantage that the life of the repellent effect is improved.

The resin constituting the resin layer is not particularly limited, and for example, a urethane resin, an acrylic resin, an olefin resin, a natural rubber resin, and the like can be used. Preferably, an acrylic resin is used.

Thus, the wrapping tape of the present embodiment in which the fabric as described above is integrated on the rear side of the substrate having the above-described stem can be easily wrapped without being limited by the size and shape of the object, and exhibits an excellent insect repellent effect. In the present invention, it is preferable that the loop-shaped engagement element exists on the rear side of the portion where the male engagement element exists on the front surface. As a result, there is an advantage that the male engagement element on the front surface and the loop on the rear surface can be easily wrapped without being limited by the size or shape of the object, with the substrate, the adhesive layer and the fabric interposed therebetween.

As a binding tape that is widely available in the market, a loop fabric having a loop-shaped engagement element on the surface is connected to the end of a substrate having a male engagement element on the surface so that the loop-shaped engagement element is on the rear side. In the tape where the location of the male engagement element and the location of the loop-shaped engagement element are different from each other, the insect repellent tape of the present embodiment described above cannot be obtained. That is, in order to obtain the above advantages, it is important that a loop is present on the rear side of the portion where the male engagement element is present.

The width of the wrapping tape of the present embodiment is not particularly limited, but is preferably about 20 to 200 mm. If the tape width is less than 20 mm, insects (such as cockroaches) cross over the tape, and thus the repellent effect may be reduced. On the other hand, if the width exceeds 200 mm, production of the tape may be difficult, and its wrapping may be also difficult to perform. More preferably, the width of the tape is 40 to 100 mm. In the method of the substrate example 3 described above, it is difficult to manufacture a tape having a width exceeding 40 mm. On the other hand, the method of the substrate example 2 is preferable because it is easy to manufacture a wide tape by increasing the number of mold rings to be stacked.

The wrapping tape for repelling insects of the present embodiment can be used for various objects to be protected from insects. "Objects to be protected from insects" means objects to which insects can move, such as trunks and branches of trees and vegetables, walls, pillars, etc., and general industrial products that may cause some damage due to insects entering inside. Specific examples of such objects include equipment, machines and devices, such as relay boxes, transformer boxes, communication relay boxes, cubicles, water meters, electricity meters, gas meters, vending machines (especially cup-type beverage vending machines), guide lights including land and air transportation, traffic lights, agricultural machinery, and personal computers, and in addition, buildings such as houses, apartments, condominiums, buildings, and hotels.

In particular, in the wrapping tape, it is possible to prevent insects from entering before reaching the gap where insects can enter, only by, for example, wrapping insect repellent parts around a long object that becomes a passage for insects to enter. Here, the term "long object" means those in which the length (L) in the longitudinal direction is longer than the diameter (N) of the radial section, and the relationship of L>N is established, such as wiring, conductor, cord, cable, and pipe.

And in the present invention, a long object wrapped with the wrapping tape for repelling insects is included, i.e., a long object is wrapped with the tape which faces the surface, on which the stem is present, outward, the front surface where the stem is present and the rear surface where the loop is present are overlapped, and the stem is engaged with the loop to fix the wrapping state, so that a long object fixed with a wrapping tape for repelling insect is obtained. This wrapping tape is also included in the present invention.

There is no particular limitation on the wrapping method around the long object, and for example, the wrapping tape can be firmly fixed to the long object having a length by wrapping it in a spiral shape. Moreover, the wrapping tape of the present embodiment can have, for example, both a function to bundle a plurality of long bodies and a function to repel insects.

This specification discloses various modes of technology as described above, and the main technologies are summarized below.

The wrapping tape for repelling insects according to an aspect of the present invention is a wrapping tape for repelling insects, characterized by having a number of male engagement elements on the front surface of the tape, and a number of loop engagement elements on the rear surface of the tape, wherein the male engagement elements and the loop-shaped engagement elements can be engaged each other, and an insect repellent component is applied at least to the front surface of the tape and the male engagement elements.

In the wrapping tape for repelling insects according to one aspect of the present invention, there are characteristics such that a number of stems made of a thermoplastic resin are provided on the surface of a substrate made of the resin; a fabric having a number of loops made of fibers is integrated with the side in which the loops are present and which is facing outward, on the rear surface of the substrate; the stem has a shape having an expanded head portion, a protruding portion that projects laterally, or a protruding form in a direction parallel to or approaching the substrate from the stem; the loop is engageable with the stem; and an insect repellent component is added to the thermoplastic resin.

According to the wrapping tape for repelling insects of the present invention, since the loop-shaped engagement element exists on the rear side, the outer male engagement element engages with the loop-shaped engagement element, and the insect repellent tape can be easily wrapped without being restricted by the size or shape of the object to be installed. In addition, it is easy to adjust the wrapping condition so that there is no gap, and since there are a number of loop-shaped engagement elements on the rear side, there is an effect of closing the gap and the insect repellent effect can be further enhanced.

Furthermore, since the specific surface area is improved by the presence of the male engagement element with the repellent component on the surface of the tape with the repellent component, the insect repellent effect is further improved by the insect repellent. In addition, since there are a number of loop-shaped engagement elements on the rear side, it is difficult to cause slippage between the long object and the tape, and thus the tape can be prevented from sliding off from the surface of the object (particularly long object).

Further, in the wrapping tape for repelling insects, it is preferable that the tape includes a male engagement element existing on the surface, a loop-shaped engagement element existing on the rear surface, and a substrate made of a thermoplastic resin, between the male engagement element and the loop-shaped engagement element, and a fabric adhered to the rear surface of the substrate via an adhesive layer, wherein the male engagement element present on the surface is made of the same thermoplastic resin as the resin constituting the substrate; the male engagement element has a stem that rises from the substrate, and the tip of the stem has an expanded head portion or a protruding portion that projects laterally, or the tip of the stem is parallel to the substrate or the stem is bent in the direction approaching the substrate; the loop-shaped engagement element is present on the rear surface of the fabric; and an insect repellent component is added to the thermoplastic resin.

In addition, it is also preferred that the male engagement elements in which the tip end portion of the stem is bent in the tape length direction and in an inverted J shape are arranged in a row in the tape length direction, and the direction of bending is the opposite direction in units of one row or multiple rows.

It is considered that the above-described effects can be obtained more reliably with the above configuration.

In the wrapping tape for repelling insects, the fabric is preferably a tricot knitted fabric. Thereby, a wrapping tape which is excellent in adhesiveness, engagement property, flexibility, etc. can be obtained.

Furthermore, in the wrapping tape for repelling insects, the total surface area of the stem and the substrate is preferably 1.5 to 4 times the surface area of the substrate. It is considered that the insect repellent effect is thereby further improved.

In the wrapping tape for repelling insects, it is preferable that the thermoplastic resin is a polyolefin resin, and the fabric is integrated with a polyurethane adhesive or an acrylic adhesive on the rear surface of the substrate via an acrylic resin layer.

By using the acrylic resin layer interposed, the adhesion property between the substrate and the fabric is greatly improved. Further, by applying the acrylic resin layer to the rear surface of the substrate, it is considered that the insect repellent component can be prevented from being released slowly from the rear surface, so that the repellent effect lasts longer.

In addition, the polyolefin resin is preferably polypropylene containing 5 to 40 weight % of a polyolefin elastomer. Thereby, even if engagement and peeling are repeated, it is considered that the protruding portion or the expanded head portion is less likely to tear from the stem, and the life of the wrapping tape is improved. Furthermore, the adhesiveness to a thin long object is also improved.

In the wrapping tape for repelling insects, the tape width is preferably 20 to 200 mm. Thereby, sufficient insect repellent effect can be obtained more reliably. Such a width is also preferable for cost and manufacturing reasons.

In the wrapping tape for repelling insects, the insect repellent component is preferably a pyrethroid compound. Thereby, insects, particularly hated insects such as cockroaches can be more reliably avoided.

Furthermore, it is preferable that the pyrethroid compound is etofenprox. Thereby, it is considered that a more reliable insect repellent effect can be obtained without adversely affecting the human body.

Furthermore, it is preferable that an insect repellent component in an amount of 1 to 20 weight % based on the resin amount is added to a thermoplastic resin constituting the substrate and the stem. Thereby, a sufficient insect repellent effect can be obtained efficiently.

In a long object according to another aspect of the present invention, there are characteristics such that the wrapping tape for repelling insects is wrapped around a long object, with the tape surface on which the male engagement element is present being facing outward, and the surface where the male engagement element is present and the rear surface where the loop-shaped engagement element is present are overlapped to engage the male engagement element with the loop-shaped engagement element, thereby to fix the wrapping state enabling the wrapping tape for repelling insects to fix.

Hereinafter, the present invention will be described more specifically with reference to Examples, but the scope of the present invention is not limited thereto.

EXAMPLES

Evaluation Test 1

Example 1

An insect repellent component-containing material in which an insect repellent component (ethofenprox) was blended by 20 weight % in a 1:1 composite material of polyethylene and ethylene vinyl acetate was added so as to be 5 weight % with respect to a resin with an 8:2 blending ratio of polypropylene (EA-7WD manufactured by Japan Polypropylene Corp.) and ethylene elastomer (V0141 manufactured by Sumitomo Chemical Co., Ltd.) as a thermoplastic resin for substrates and stems. The obtained mixture was extruded from a nozzle as shown in FIG. 4 at 200° C., followed by immediately putting into cold water to produce a tape-like material having stem rows on the surface, and the stem was cut in the direction perpendicular to the tape length direction from the top to the root of the stem rows, stretched 2.0 times at 148° C. in the tape length direction and fixed in this state at 153° C. for 30 seconds, thereby to obtain a substrate in which the repellent component was kneaded.

The obtained substrate has a protruding portion that injects laterally as shown in FIG. 2 as a stem, and the thickness of the substrate is 0.1 mm; the height of the stem is 0.9 mm from the substrate surface; the width of the protruding portion that projects laterally was 0.6 mm; the width in the length direction of the stem was 0.35 mm; and the density was 98 stems/cm$^2$.

Next, an acrylic resin (EA-G31, manufactured by Toyo-Morton, Ltd.) and then a urethane hot melt adhesive (RHA-100, manufactured by No-tape Industrial Co., Ltd.) were applied to the rear side of the obtained substrate. The surfaces of Tricot E5000C made by Kuraray Fastening Co., Ltd., which had no tricot pile (loop), were continuously bonded to the above applied rear surface of the substrate and cured at room temperature for 48 hours.

The width of the obtained wrapping tape for repelling insects was set to 50 mm.

Example 2

A wrapping tape for repelling insects was obtained in the same manner as in Example 1 except that a woven loop surface fastener ("B2790Y.11 (product name), manufactured by Kuraray Fastening Co., Ltd.") was used as the fabric to be bonded to the rear side.

Example 3

A wrapping tape for repelling insects was obtained in the same manner as in Example 1 except that the tricot knitted fabric was directly integrated without forming an acrylic resin layer on the rear side of the substrate.

Example 4

A woven hook surface fastener (surface fastener A8693Y.00, manufactured by Kuraray Fastening Co., Ltd.) applied with the same insect repellent as in Example 1 on the surface so that the amount of the insect repellent component was 5 weight % and a woven loop surface fastener (B2790Y.11, manufactured by Kuraray Fastening Co., Ltd.) were prepared. They were bonded with a polyurethane adhesive via the same acrylic resin layer as in Example 1 to obtain a wrapping tape for repelling insects. The width of the tape was 50 mm.

Comparative Example 1

An insect repellent component-containing resin spiral tape ("AR Spiral Tube", diameter 20 mm, length 50 mm, manufactured by Nix, Inc.) was used. The content of the insect repellent component in the tape was 5 weight % as in Example 1.

Comparative Example 2

A wrapping tape for repelling insects was obtained in the same manner as in Example 1 except that the stem was a rod-shaped stem having no protrusion portion.

Example 5

A wrapping tape for repelling insects was obtained in the same manner as in Example 1 except that the insect repellent component was not included in the polypropylene resin and was applied to the surface of the stem and the substrate so that the amount of the insect repellent component was 5 weight %.

Measurement of Specific Surface Area

The ratio of the total area of the stem and the substrate of each Example and Comparative Example was calculated when the surface area of the spiral tape (conventional product) of Comparative Example 1 was defined as 1.

Tape Attachment/Detachment Time

The time taken to wrap and bundle the tape around a φ22 mm polyvinyl chloride pipe and then remove it was measured.

Specifically, for the spiral tape of Comparative Example 1, an AR spiral tube was wrapped around a polyvinyl chloride pipe and the time required to remove it was measured.

The wrapping tapes of the other Examples and Comparative Examples were similarly wrapped around a polyvinyl chloride pipe by wrapping the tape one turn on the circumference so that the stem was facing outward and then engaging the stem and the tricot to bundle them together. Then, the time required to remove the engagement and release the bundling was measured. The number of each sample measured was 5, and the average value of 5 samples was calculated.

Insect Repellent Effect Test

Figure 5:
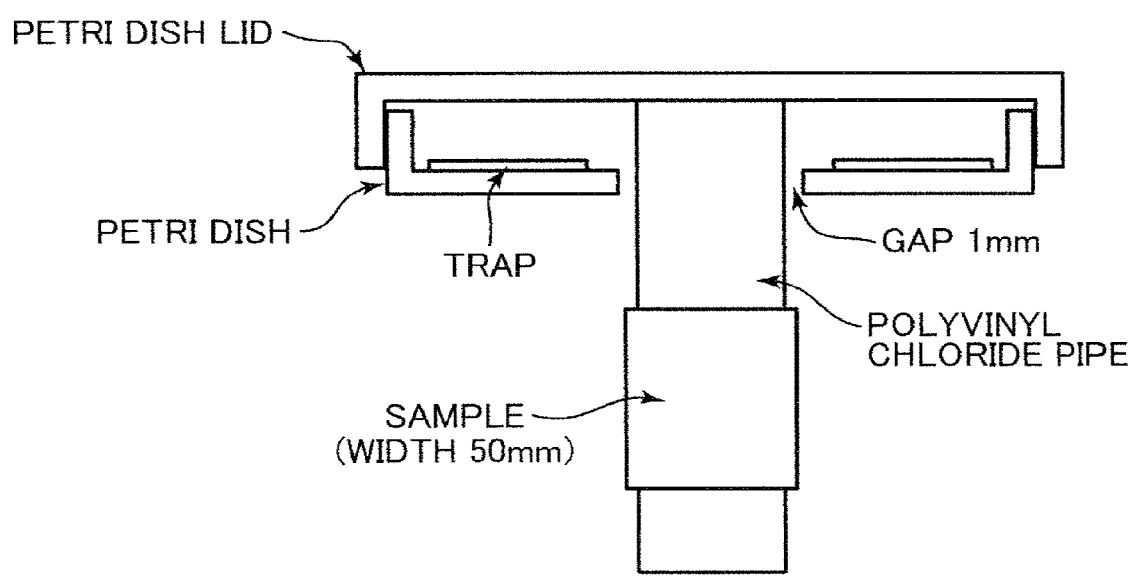
FIG. 5 is a schematic view showing an aspect of an insect invasion prevention test conducted in Examples.

The polyvinyl chloride pipe around which the sample was wrapped in the above attachment/detachment test was stood up in a sealed test container. And the insect repellent effect was confirmed by the insect invasion prevention test as shown in FIG. 5. Specifically, a plastic petri dish having a hole with a size such that a gap between the dish and the polyvinyl chloride pipe is 1 mm on both sides was prepared in the center. A sticky trap and a biscuit for food were placed inside the petri dish with the hole. Next, the petri dish and the petri dish lid were fixed and installed from above the standing polyvinyl chloride pipe. Then, 20 ants (Monomorium intrudens were placed in the sealed test container and left for 24 hours. After that, the number of the ants that could be avoided was determined from the number of the ants in the petri dish (repellent number=total number−number of the ants captured in the petri dish), and the repellent effect of each test was displayed as a ratio with respect to the case where the repellent effect of Comparative Example 1 (conventional product) was defined as 100

Sustainability Test of Insect Repellent Effect

The sample wrapped by the repellent effect test method described above and the ants (Monomorium intrudens) were left in a room temperature environment, and the number of days when the repellent effect could not be confirmed was confirmed. Loss of repellent effect was considered as a loss of such effect when ¾ of the number of Monomorium intrudens left in the tester passed through the sample. The results are shown in Table 1.

The above results are shown in Table 1.

TABLE 1

|  | EXAMPLE 1 | EXAMPLE 2 | EXAMPLE 3 | EXAMPLE 4 | COMPARATIVE EXAMPLE 1 | COMPARATIVE EXAMPLE 2 | EXAMPLE 5 |
|---|---|---|---|---|---|---|---|
| SUBSTRATE | PRESENCE OF PROTRUSION PORTION ON THE STEM | PRESENCE OF PROTRUSION PORTION ON THE STEM | PRESENCE OF PROTRUSION PORTION ON THE STEM | WOVEN HOOK SURFACE FASTENER | RESIN SPIRAL TAPE | ROD-SHAPED STEM | PRESENCE OF PROTRUSION PORTION ON THE STEM |

TABLE 1-continued

| | EXAMPLE 1 | EXAMPLE 2 | EXAMPLE 3 | EXAMPLE 4 | COMPARATIVE EXAMPLE 1 | COMPARATIVE EXAMPLE 2 | EXAMPLE 5 |
|---|---|---|---|---|---|---|---|
| FABRIC | TRICOT | WOVEN LOOP SURFACE FASTENER | TRICOT | WOVEN LOOP SURFACE FASTENER | — | TRICOT | TRICOT |
| SURFACE AREA RATIO | 2.2 | 2.2 | 2.2 | — | 1 | 1.6 | 2.2 |
| ACRYLIC RESIN LAYER | PRESENCE | PRESENCE | ABSENCE | PRESENCE | — | PRESENCE | PRESENCE |
| REPELLENT CONTENT (% BY WEIGHT) | 5 | 5 | 5 | 5 | 5 | 5 | 5 |
| REPELLENT-CONTAINING METHOD | CONTAINED IN THE RESIN | CONTAINED IN THE RESIN | CONTAINED IN THE RESIN | APPLIED ONTO THE SURFACE | CONTAINED IN THE RESIN | CONTAINED IN THE RESIN | APPLIED ONTO THE SURFACE |
| REPELLENT EFFECT | 120 | 120 | 120 | 105 | 100 | 113 | 105 |
| SUSTAINABILITY (LIFE) | 1 TO 3 YEARS | 1 TO 3 YEARS | 9 MONTHS TO 1.5 YEARS | 1 MONTH | 1 TO 3 YEARS | 1 TO 3 YEARS | 1 MONTH |
| TIME REQUIRED FOR ATTACHMENT AND DETACHMENT | 3 SECONDS | 3 SECONDS | 3 SECONDS | 3 SECONDS | 15 SECONDS | NO ENGAGEMENT | 3 SECONDS |

Discussion

In Examples 1 to 3 according to the present invention, any insect repellent effect was superior to that of the conventional product (Comparative Example 1), and the effect lasted even for 9 months to 3 years. Furthermore, while 15 seconds were required for attachment/detachment of the spiral tape of Comparative Example 1, the spiral tapes of Examples 1 to 3 were all attachable/detachable in 3 seconds. However, in Example 2, since a tricot was not used as the fabric on the rear surface, the engagement force was inferior to that in Example 1 using a tricot. Moreover, in Example 3 which did not interpose an acrylic resin layer, the lamination force was a little inferior to that of Example 1 in which an acrylic resin layer was formed. As a result, the tricot was easily peeled off.

On the other hand, in Examples 4 and 5 in which the insect repellent component is not contained in the resin and only applied to the surface, a sufficient repellent effect was exhibited at the beginning of installation, but the effect did not last when left outdoors. However, the wrapping tape could be used sufficiently in a room that was not exposed to wind and rain or heat. In Comparative Example 1, which is a case of a conventional product, it took a considerable time to attach/detach the wrapping tape. In Comparative Example 2 in which a rod-shaped member having no protruding portion or the like was used as the stem, the rod-shaped member did not engage and therefore did not function as a wrapping tape.

Furthermore, when the tapes of these Examples and Comparative Examples were attached to the surface of a square lumber of 5 cm square, the tapes of Examples 1 to 5 in which the loop fabric was present on the rear surface could be fixed without slipping from the surface of the square lumber and it was possible to prevent the passage of insects by the loop fiber between the square lumber and the tape, while in Comparative Example 1 in which the loop fabric is not present on the rear surface, a gap through which insects can pass was formed. Therefore, according to the tape of the present invention, it was shown that an insect repellent tape can be easily wrapped around even a square lumber without being limited to the size and shape of a target object to be installed.

Evaluation Test 2

The content of the repellent component was reduced, and the effect was compared with the conventional technology.

Example 6

A wrapping tape for repelling insects was obtained in the same manner as in Example 1 except that the content of the insect repellent component was changed to 0.5 weight % with respect to the resin amount.

Comparative Example 3

An insect repellent component-containing resin spiral tape ("AR Spiral Tube" manufactured by Nix, Inc.; diameter 20 mm, length 50 mm) was used. The content of the insect repellent component in the tape was 0.5 weight % as in Example 4.

The same evaluation test as in Example 1 was performed on each tape of Example 6 and Comparative Example 3 above. The results are shown in Table 2.

TABLE 2

| | EXAMPLE 6 | COMPARATIVE EXAMPLE 3 |
|---|---|---|
| SUBSTRATE | PRESENCE OF PROTRUSION PORTION ON THE STEM | RESIN SPIRAL TAPE |
| FABRIC | TRICOT | |
| SURFACE AREA RATIO | 2.2 | 1 |
| ACRYLIC RESIN LAYER | PRESENCE | |
| REPELLENT CONTENT (% BY WEIGHT) | 0.5 | 0.5 |
| REPELLENT-CONTAINING METHOD | | CONTAINED |
| REPELLENT EFFECT | 70 | 40 |
| SUSTAINABILITY (LIFE) | 3 MONTHS TO 9 MONTHS | 3 MONTHS TO 9 MONTHS |
| TIME REQUIRED FOR ATTACHMENT AND DETACHMENT | 3 SECONDS | 15 SECONDS |

Discussion

From the results shown in Table 2, it is understood that even if the content of the repellent component is reduced, any of the repellent effect, durability, and attachability/detachability in the wrapping data of the present invention is excellent as compared with the conventional product (Comparative Example 3).

Example 7

In Example 1, an insect repellent component-containing tape was produced by the same method as in Example 1 except that a substrate having a stem in which the repellent component was kneaded was used.

That is, first, many sheets of a ring-shaped mold piece (1) in which a number of engagement element spaces having an inverted J shape and the same direction of the inverted J shape are carved on the outer circumference at equal intervals, a metal ring (2) in which no such space is dug on the outer circumference, and a ring-shaped mold piece (3) which is the same with the ring-shaped mold piece (1) except that the direction of the inverted J-shaped engagement element is reversed are overlapped in the order of (1)-(2)-(3)-(2), thereby to prepare a mold roller having a cavity for forming an inverted J-shaped engagement element on the outer circumference.

A 65 mm width substrate having male engagement elements was produced with such a mold roller by using a mixture of a 1:1 composite material of polyethylene and ethylene vinyl acetate added with an insect repellent component-containing material containing 20 weight % of an insect repellent component (ethofenprox) so as to be 5 weight % with respect to a resin with an 8:2 blending ratio of polypropylene and ethylene elastomer used as a molding resin in Example 1.

Specifically, this resin was melt-extruded at 190° C. and was pressed and stretched between the mold roller having a cavity (cavity holding type: width 150 mm) and another drum roller existing at a position opposite to said mold roller. The resin was filled in the cavity, cooled while being rotated, and peeled off by a nip roller to form a sheet having an inverted J-shaped male engagement element on its surface (effective width of engagement element: 140 mm). The surface area ratio of this sheet was 2.4.

The shape of the male engagement element of the obtained sheet had a curved shape in which the stem protruding from the substrate bends in the sheet length direction from the middle and the tip portion is curved approaching on the surface of the resin substrate, that is, an inverted J shape. The sheet surface has such inverted J-shaped male engagement elements at a density of 100 engagement elements/cm$^2$, and all the inverted J-shaped engagement elements are arranged in the same direction in a row unit. However, they were bent in the opposite direction in adjacent row units. The height of the engagement element was 0.5 mm, the protruding length of the engagement element was 0.1 mm, and the thickness of the substrate was 0.2 mm.

Then, an acrylic resin and then a urethane hot melt adhesive were applied to the rear surface of the sheet in the same manner as in Example 1, and a tricot fabric was continuously bonded to the surface and cured at room temperature for 48 hours.

The performance of the insect repellent tape obtained was measured in the same manner as in the above example. As a result, the repellent effect was 121, the sustainability was 1 to 3 years, and the time required for attachment/detachment was 3 seconds, and thus the same excellent performance as in Example 1 was exhibited. Furthermore, when this insect repellent tape was wrapped around a 5 cm square lumber, loop fibers on the rear surface of the tape existed so as to shield the gap between the square lumber and the insect repellent tape, so that it was impossible for insects to enter through the gap.

This application is based on Japanese Patent Application No. 2017-139667 filed on Jul. 19, 2017, the contents of which are included in the present application.

The present invention is properly and sufficiently described above using the embodiment with reference to the drawings and specific Examples. It should be understood that a person skilled in the art may easily alter and/or modify the embodiment described above. Therefore, alterations or modifications made by a person skilled in the art may fall within the scope of the claims unless the degree of such alterations or modifications is beyond the scope of the claims.

INDUSTRIAL APPLICABILITY

The present invention has a wide industrial applicability in the technical field relating to insect repellents and tapes.

The invention claimed is:
1. A wrapping tape, comprising:
a number of male engagement elements on a front surface of the wrapping tape;
a number of loop-shaped engagement elements on a rear surface of the wrapping tape and
a substrate made of a thermoplastic resin, between the male engagement elements and the loop-shaped engagement elements,
wherein the male engagement elements and the loop-shaped engagement elements are configured to engage each other,
wherein an insect repellent component is applied to the front surface of the wrapping tape and the male engagement elements,
wherein each of the male engagement elements on the surface of the tape is made of a same thermoplastic resin as that of the substrate, and wherein the thermoplastic resin comprises the insect repellent component extruded within the thermoplastic resin.

2. The tape of claim 1, further comprising:
a fabric adhered to a rear surface of the substrate via an adhesive layer,
wherein each of the male engagement elements comprises a stem that rises from the substrate, and a tip of the stem comprises an expanded head portion or a protruding portion that projects laterally, or the tip of the stem is parallel to the substrate or bent in a direction approaching the substrate, and
wherein each of the loop-shaped engagement elements is present on a rear surface of the fabric.

3. The tape of claim 2, wherein comprising the male engagement elements in which a tip portion of the stem is bent in a tape length direction and in an inverted J shape are arranged in rows in a tape length direction, and
wherein one row or a plurality of rows is bent in an opposite direction.

4. The tape of claim 2, wherein the fabric is a tricot knitted fabric.

5. The tape of claim 2, wherein a total surface area of the stem and the substrate is in a range of from 1.5 to 4 times a surface area of the substrate.

6. The tape of claim 2, wherein the thermoplastic resin is a polyolefin resin, and
wherein the fabric is integrated on the rear surface of the substrate with a polyurethane adhesive via an acrylic resin layer.

7. The tape of claim 6, wherein the polyolefin resin is a polypropylene comprising 5 to 40 weight % of a polyolefin elastomer.

8. The tape of claim 2, wherein an insect repellent component is present within the thermoplastic resin in the substrate and the stem in an amount of from 1 to 20 weight %, with respect to an amount of the resin.

9. The tape of claim 2, wherein the fabric is integrated on the rear surface of the substrate with an acrylic adhesive via an acrylic resin layer.

10. The tape of claim 1, wherein a tape width is in a range of from 20 to 200 mm.

11. The tape of claim 1, wherein the insect repellent component is a pyrethroid compound.

12. The tape of claim 1, wherein the insect repellent component comprises etofenprox.

13. An arrangement, comprising an object and, fixed to the object, the tape of claim 1, wrapped around the object,
wherein a side of the tape on which the male engagement elements are present faces outward, overlapping a front surface on which the male engagement elements are present and a rear surface on which the loop-shaped engagement elements are present, and
wherein the male engagement elements are engaged with the loop-shaped engagement elements to fix a wrapping state.

14. The tape of claim 1, further comprising:
a fabric adhered to a rear surface of the substrate via an adhesive layer,
wherein each of the male engagement elements comprises a stem that rises from the substrate, and a tip of the stem comprises an expanded head portion, and
wherein each of the loop-shaped engagement elements is present on a rear surface of the fabric.

15. The tape of claim 1, further comprising:
a fabric adhered to a rear surface of the substrate via an adhesive layer,
wherein each of the male engagement elements comprises a stem that rises from the substrate, and a tip of the stem comprises a protruding portion that projects laterally, and
wherein each of the loop-shaped engagement elements is present on a rear surface of the fabric.

16. The tape of claim 1, further comprising:
a fabric adhered to a rear surface of the substrate via an adhesive layer,
wherein each of the male engagement elements comprises a stem that rises from the substrate, and a tip of the stem is parallel to the substrate, and
wherein each of the loop-shaped engagement elements is present on a rear surface of the fabric.

17. The tape of claim 1, further comprising:
a fabric adhered to a rear surface of the substrate via an adhesive layer,
wherein each of the male engagement elements comprises a stem that rises from the substrate, and a tip of the stem is bent in a direction approaching the substrate, and
wherein each of the loop-shaped engagement elements is present on a rear surface of the fabric.

18. The tape of claim 1, wherein the thermoplastic resin is a polyolefin resin.

19. The tape of claim 1 wherein the thermoplastic resin comprises polyethylene.

20. The tape of claim 1, wherein the thermoplastic resin comprises polypropylene.

* * * * *